Figure 1:
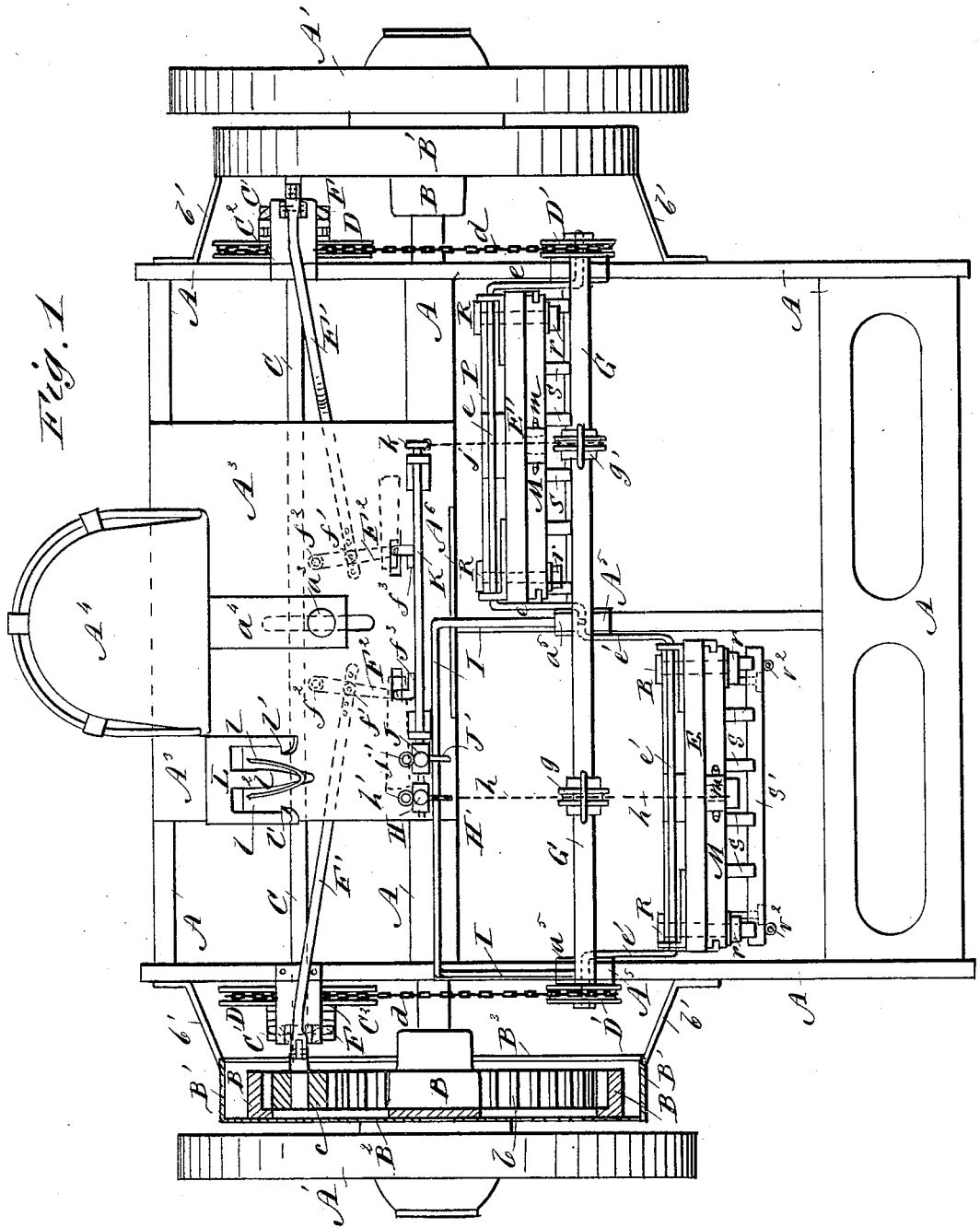

(No Model.) 5 Sheets—Sheet 1.

F. P. SANBORN.
COMBINED PLOW, HARROW, AND CULTIVATOR.

No. 371,370. Patented Oct. 11, 1887.

WITNESSES:
C. Neveux
C. Sedgwick

INVENTOR:
F. P. Sanborn
BY Munn & Co
ATTORNEYS.

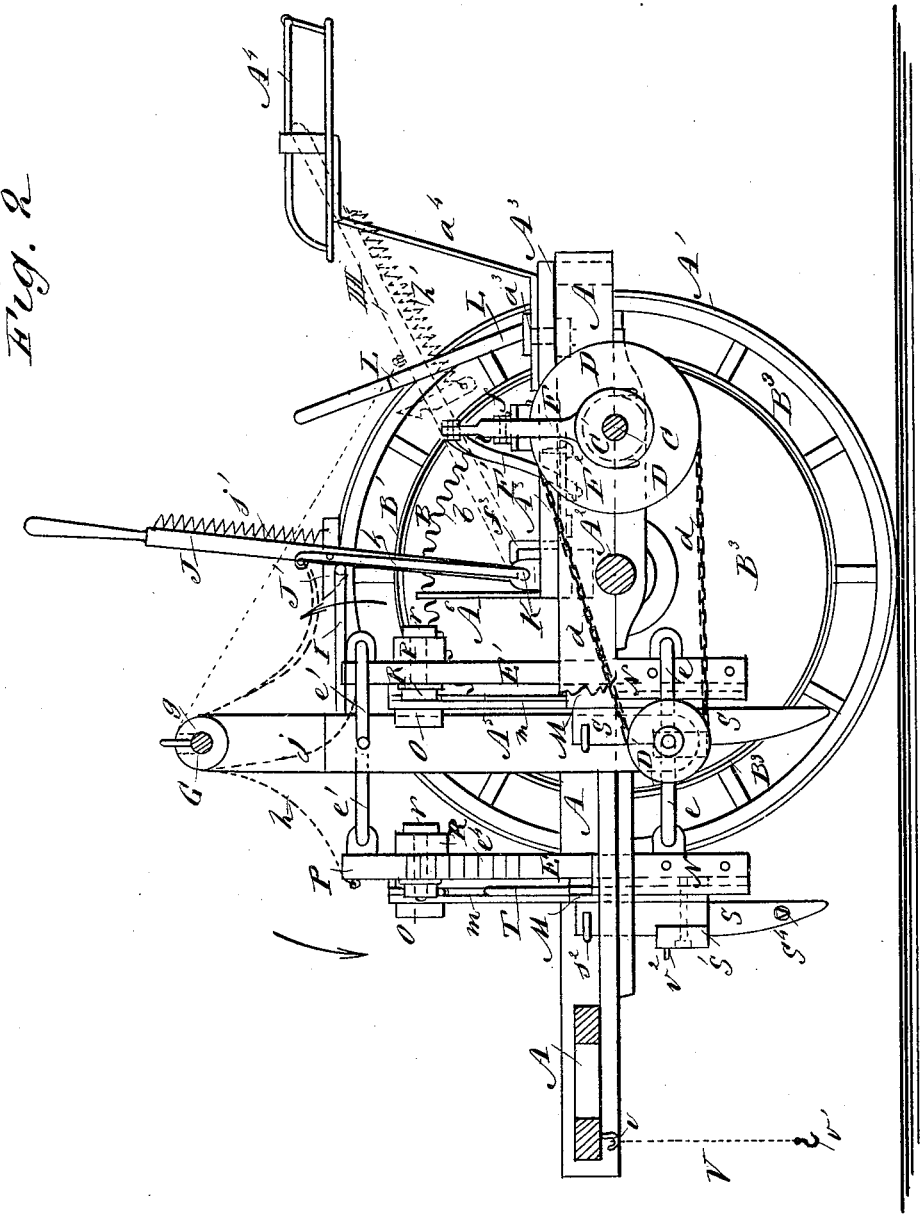

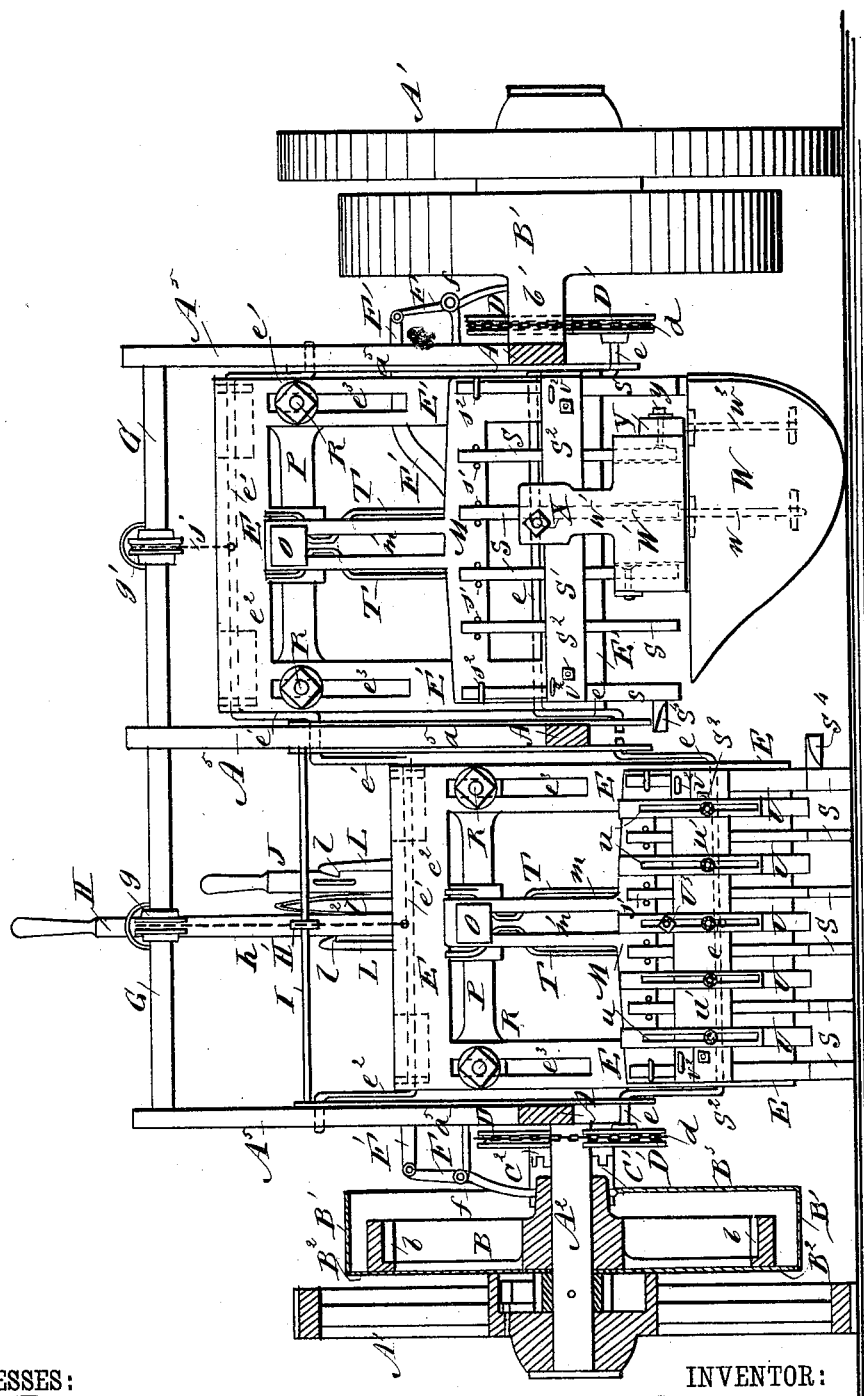

(No Model.) 5 Sheets—Sheet 4.
F. P. SANBORN.
COMBINED PLOW, HARROW, AND CULTIVATOR.
No. 371,370. Patented Oct. 11, 1887.
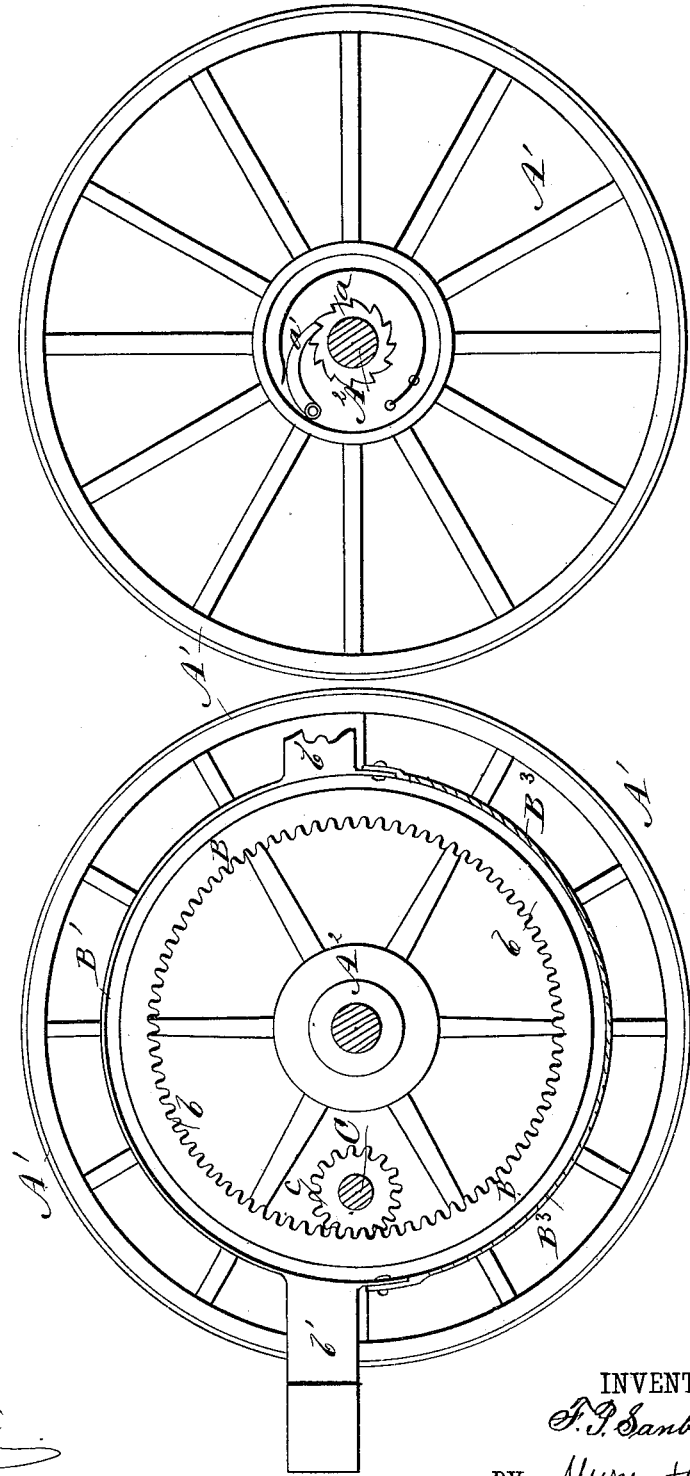
WITNESSES:
C. Neveux
C. Sedgwick
INVENTOR:
F. P. Sanborn
BY Munn & Co
ATTORNEYS.

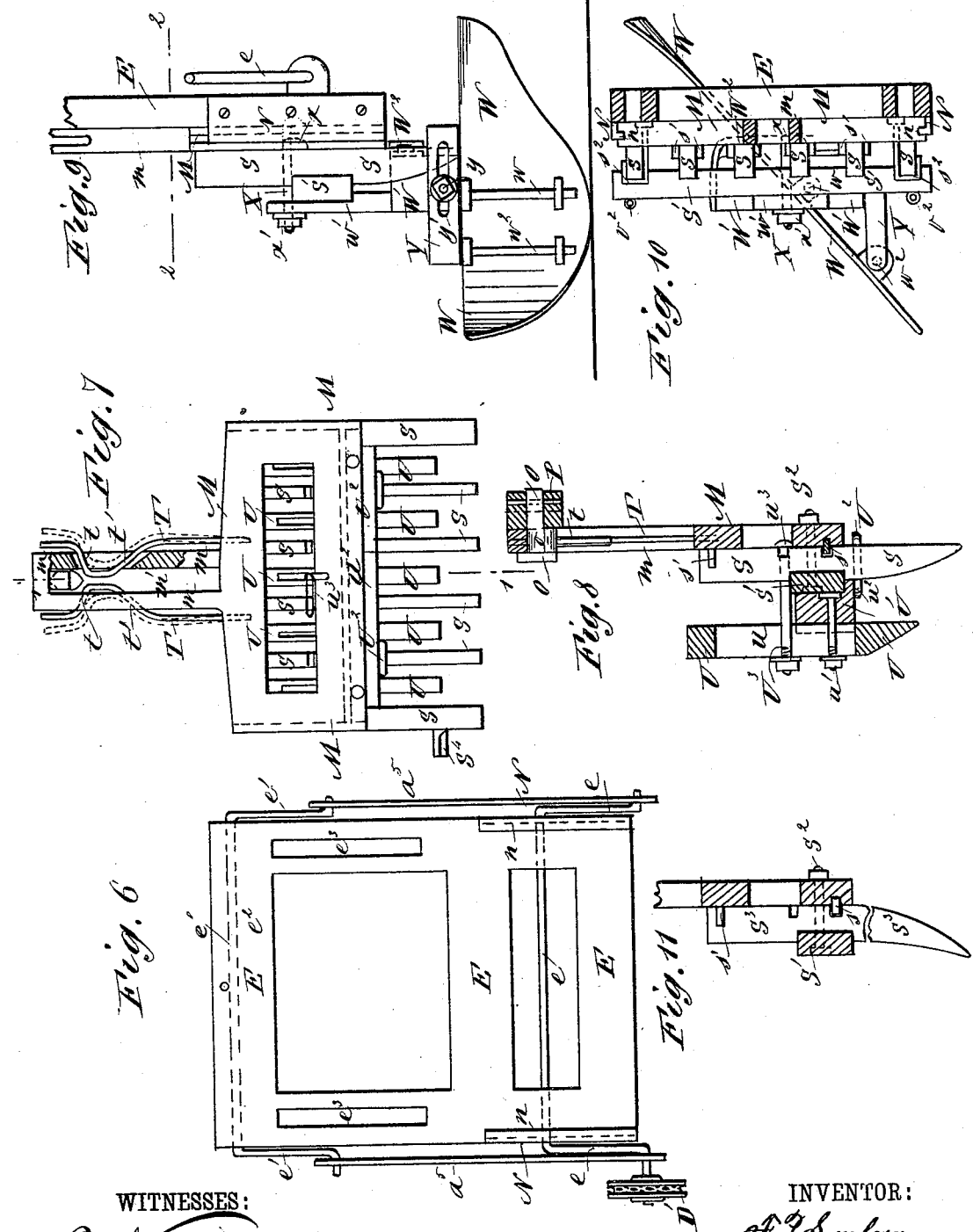

United States Patent Office.

FRANKLIN PIERCE SANBORN, OF STANDISH, MAINE.

COMBINED PLOW, HARROW, AND CULTIVATOR.

SPECIFICATION forming part of Letters Patent No. 371,370, dated October 11, 1887.

Application filed June 10, 1887. Serial No. 240,899. (No model.)

*To all whom it may concern:*

Be it known that I, FRANKLIN PIERCE SANBORN, of Standish, in the county of Cumberland and State of Maine, have invented a new and Improved Combined Plow, Harrow, and Cultivator, of which the following is a full, clear, and exact description.

My invention relates to an agricultural implement adapted for plowing, harrowing, and drilling the soil, for preparing it to receive crops, and for cultivating the soil around the growing plants; and the invention has for its object to provide a simple, effective, and easily-manageable machine of this character, which may be quickly adjusted to perform its various functions and allow the work to be done with economy of time and labor.

The invention consists in certain novel features of construction and combinations of parts of the implement, all as hereinafter fully described and claimed.

Reference is to be had to the accompanying drawings, forming a part of this specification, in which similar letters of reference indicate corresponding parts in all the figures.

Figure 1 is a plan view of my improved machine, partly in horizontal section, and with the parts in operative positions. Fig. 2 is a side elevation of the machine, partly in longitudinal section. Fig. 3 is a front view of the machine, partly in vertical transverse section, and with a smoothing-harrow attachment applied at one of the swinging frames, and a cultivating or drilling plow attachment applied at the other swinging frame. Fig. 4 is an inside face view of one of the supporting-wheels and the adjacent driving-wheel and pinion, with their respective shafts in section. Fig. 5 is an inner face view of one of the supporting-wheels and its ratchet mechanism. Fig. 6 is a front face view of one of the swinging frames and attached cranked shafts and driving chain-wheel. Fig. 7 is a front face view of the plow and harrow-tooth head detached from its swinging frame and partly broken away and in section. Fig. 8 is a vertical transverse section taken on the line 1 1, Fig. 7. Fig. 9 is a side elevation of the lower part of one of the swinging frames with the plow attachment applied thereto. Fig. 10 is a plan view thereof, with parts in horizontal section, on the line 2 2, Fig. 9; and Fig. 11 is a vertical sectional elevation illustrating another form of harrow-tooth and part of the head to which it is attached.

The main frame A of the machine is supported upon a truck formed of wheels A' A' and an axle, A², on which the wheels are loosely fitted. A ratchet, $a$, fixed to the axle within the hub of each wheel, is engaged by a spring-pressed pawl, $a'$, pivoted to the wheel to cause the axle to turn with the wheel when the machine is drawn forward, and allow the wheel to slip around the axle on the backward movement, to facilitate turning the machine easily and in a well-known manner.

To the axle A², next each wheel A', is fixed a driving-wheel, B, having internal cogs or teeth, $b$, which are engaged by the teeth of a pinion, $c$, which is fixed to a driving-shaft, C, journaled to and across the frame behind the axle, and to the shaft C, next the pinion $c$, at each side of the machine, there is splined a half-clutch, C', which may be shifted to engage with a half-clutch, C², which is fast to a chain-wheel, D, which is fitted loosely on the shaft C, and from which a chain belt, $d$, passes to a chain-wheel, D', which is fixed to a wrist or crank of a lower cranked shaft, $e$, on which and an upper cranked shaft, $e'$, a plow and harrow-tooth holding or supporting frame E is journaled, for the purposes hereinafter explained.

Each driving-wheel B is partially inclosed by a casing consisting of a ring or band, B', which surrounds the rim of the wheel, and a face-plate, B², which is fastened to and covers the outer face of the wheel and turns with said wheel, and the ring B' has support from opposite brackets or braces, $b'$, which are fixed to it and to the main frame. The inner face of the drive-wheel is covered for about half its height by a plate, B³, which is fastened to the ring or band B' and is also supported from the brackets $b'$. (See Figs. 1, 2, 3, and 4 of the drawings.) By thus incasing the drive-wheels their cogs $b$ and the pinions $c$ will be protected from mud and dirt which may be thrown or carried up by the truck-wheels, and the driving-gearing will not be clogged.

To each of the half-clutches C' a forked shipping-bar, F, is fitted, and this bar is fulcrumed at $f$ to a support fixed to the main frame, and the upper end of the bar is pivoted to a rod, F', which ranges inward or transversely of the machine beneath the platform A³, to which the driver's seat A⁴ is held adjustably by a bolt, a³, passed through the foot of the seat-standard a⁴ and a longitudinal slot in the platform, and secured by a nut beneath the platform, and allowing adjustment of the seat to cause the driver's weight to properly balance the machine. The inner ends of the rods F' F', leading from the shipping-bars F at opposite sides of the machine, are each connected pivotally at f' with a lever, F², which is fulcrumed at f² to the under side of the platform, and is provided with an upbent end, f³, which passes through a transversely-ranging slot in the platform A³ and within reach of the foot of the attendant, who by throwing the ends f³ of the levers F² outward will engage the clutches C' C², connected to the levers, and impart motion to the chain-wheels D from the pinions c and drive wheels B, and when the levers F³ are shifted the other way the clutches will be disconnected to allow rotation of the pinions c and the drive-wheels without effect on the chain-wheels. The revolution of the chain-wheels drives the chains d and chain-wheels D', and thereby imparts rotary motion to the cranked shafts e e' of the tooth carrying frames E to operate said frames for plowing or cultivating the soil, as hereinafter more particularly described. Either or both of the clutch-levers F² may be shifted to cause either or both of the frames E to be operated, as occasion may require.

For greater convenience in describing the machine, I mark the right-hand tooth-carrying frame E, and the left-hand frame E', both of which frames are made alike, and, as shown more clearly in Fig. 6 of the drawings, the lower and upper cranked shafts, e e', of each of the frames are journaled at their cross-bars in lugs fixed to the rear faces of the frames, and the wrists at the ends of the crank-arms of the shafts are journaled preferably in bearings formed on or in metal plates a⁵, which are fixed to posts or uprights A⁵, secured to the main frame A of the machine. The crank-arms of the shafts e e' are about seven inches long, causing their frames E E' to be carried upward, forward, downward, and backward as the main parts of the shafts journaled to the frames describe a circle of about fourteen inches in diameter around the crank wrists or bearings of the shafts in the plates a⁵, or in the posts A⁵, should these plates be dispensed with.

To the tops of the posts A⁵ a transversely-ranging shaft, G, is fixed and braces the posts to each other at their tops, and on this shaft a couple of pulleys, g g', are journaled. A cord or chain, h, which is fixed to the top of the frame E, passes over the pulley g and is connected at its other end to a lever, H, which is fulcrumed at its lower end to the platform A³. About at its center the lever H is provided with a pivoted hook-headed latch, H', to which one end of a spring, h', is attached, the other end of the spring being fastened to the lever. The spring normally draws the back end of the latch upward to cause the front hooked end of the latch, when the lever is raised, to engage a transversely-ranging rod, I, which is fixed by its forwardly-bent end parts to two of the frame-posts A⁵. A cord or chain, j, which is fixed to the top of the frame E', is passed over the pulley g' on shaft G, and its other end is attached to the end of an upwardly-bent arm, k, of a rod, K, which is journaled in suitable bearings on the platform A³, and is connected at its right-hand end with a lever, J, which thus has its fulcrum in the rod K and is arranged directly next or beside the lever H, and carries a latch, J', like the one H', and actuated by a spring, j', to cause it to engage the rod I. Both levers H J thus are arranged in convenient reach of the driver from his seat A⁴.

To the platform A³ a catch-plate, L, is fixed, and this plate has two slots, l l, formed to provide hook-heads l' at one side of each slot to receive the depressed levers H J, respectively, and springs l², fitted at the inner walls of the slots, force the levers over beneath the hook heads or shoulders l' to hold them down, and thereby secure the lifted frames E E', to which the levers are connected, to prevent operation in the soil of the teeth carried by the frames. The levers may be easily released from the catches or hooks l' by lateral pressure of the levers against the springs, and when so released the levers may be thrown forward to lower the frames E E' to operative positions, and the lever catches H' J' will engage the rod I to hold the levers in raised positions, and slack off the cords or chains h j to allow the frames and attached teeth to be operated by the cranked shafts, as above described. I connect the cords h j to the frames E E' in such manner that a lowering of the respective levers H J will assure descent of the frames E E', respectively, into positions in front of and behind the frame-posts A⁵, as shown in Figs. 1 and 2, and whereby the teeth of one frame will be digging the soil while the other tooth-carrying frame is making its return or ineffective stroke, thus causing the teeth of the two frames to operate alternately in the soil. A foot-board, A⁶, is provided on the platform A³ for convenience of the attendant on the seat A⁴ to brace his feet against in operating the levers. In Fig. 1 of the drawings both levers H J are raised and latched to the cross-bar I. In Fig. 2 the lever H is shown lowered and held to the catch-plate L in dotted lines, and the lever J is raised and latched to the bar I; and in Fig. 3 the lever H is raised and latched to the bar I, and the lever J is lowered and secured at the catch-plate L.

Each of the frames E E' is provided with a series of plow and harrow teeth arranged the same way in both frames; hence I will describe the teeth and their connections with special reference to the frame E only, and as follows: The tooth-carrying head M is provided at opposite side edges with grooves, into which inturned flanges n on metal plates N, fixed to the frame E, enter, and whereby guides are formed, which, while holding the head M flatwise to the frame E, allow it to slide up and down on said frame. The head M is provided with an upwardly-projecting stem, $m$, which is slotted vertically at $m'$, to receive the stem or body portion $o$ of a pin, O, which has a head overlapping the stem $m$, and is fixed by a pin or bolt to a cross-bar, P, which lies across and against the back of the frame E, and has a forwardly-projecting boss the face of which is flush with the front face of the frame E, to allow the stem $m$ of the head M to slide over it and the top cross bar or piece, $e^2$, of the frame. Bolts R R, which are fixed in the cross-bar P, project forward through slots $e^3 e^3$ in the frame E and receive nuts $r\,r$ at the front face of the frame, thus allowing the entire tooth-carrying head M $m$ to be adjusted and held securely at any desired height on the frame to cause the teeth S, carried by the head, to work at any desired depth in the soil.

One edge, preferably the outside edge, of each of the frames E E' is marked off into a scale of inches, as shown at $e^4$ on the frame E in Fig. 2 of the drawings, the graduations ranging downward successively from the tops of the frame-slots, or from the center of the adjacent bolt R when it is at the top of the slot, and when the bolts R are at the tops of the slots the teeth S of the rotating frames will just clear the ground; hence by setting the bolts R opposite the first or top inch-scale mark the teeth S will work one inch into the soil, and by setting the bolts opposite the second inch-scale mark the teeth will work for a depth of two inches, and so on for any required depth up to the eighth scale-mark, representing a depth of eight inches, to which the teeth will penetrate the soil. The relative arrangement of the tooth-head-retaining bolts R and the scale $e^4$ thus facilitates the accurate setting of the teeth to work to any depth, as circumstances may require.

A couple of elastic rods or springs, T T, are fixed to the top of the head M, one at each side of its stem $m$, and near their upper ends the springs are bent inward toward each other to form lower inclined parts, $t'$, and upper nearly lateral parts or shoulders, $t$, said bent parts of the springs passing through slots in the sides of the stem $m$, to allow the shoulders $t$ of the springs to normally rest beneath the part $o$ of the pin O, which is beveled off a little at each side at its bottom to allow the spring-shoulders $t$ to pass by it without too great strain on the springs. In operating the teeth S in the soil the springs T will offer sufficient resistance to the rise of the tooth-head M $m$ to hold the teeth S to their work; but should the teeth strike an obstruction—such as a root or stump or rock—the springs T T will separate at their shoulders $t\,t$ and allow the head and attached teeth to rise, and thereby prevent breaking or bending of the teeth, and the inclined parts $t'$ of the springs will rest on top of the part $o$ of the pin O, and as the frame E or E' is rotated the tooth-carrying head will be at once thrown down again to allow the spring-shoulders $t$ to catch beneath the pin $o$ to assure normal action of the teeth in the soil. The upper part of the pin O, on which the inclined parts $t'$ of the springs rest, is also beveled or rounded over a little to allow downslip of the springs from the pin.

The teeth S are held to the head M as follows: A metal bar, $s$, is fixed in the front face of the head, and projects therefrom to enter notches made in the back edges of the teeth, and whereby the teeth are held securely against vertical movement, and pairs of pins $s'$ $s'$ fixed in the upper part of the frame M, one pin at each side of each intermediate tooth, hold the upper parts of the teeth against lateral movement, and a cross bar, S', provided with a series of vertical notches at its back edge, into which the front parts of the teeth snugly fit, prevents lateral movements of the lower parts or points of the teeth, and bolts $S^2$, passed through the cross-bar S' and the tooth-head M, securely hold the teeth in operative positions. The heads of the bolts $S^2$ are shown flush with the outer faces of the cross-bar S' to allow the smoothing-harrow attachment to be connected at the front of the main toothed frame, as presently described. The two outside teeth S are preferably made broader or heavier at their pointed ends, as most clearly shown in Figs. 3 and 7 of the drawings, and I prefer to use hook-headed bolts $s^2$ to secure or stay these outside teeth at or near their upper ends, instead of the pins $s'$. (See Fig. 10 of the drawings.)

The smoothing-harrow attachment consists of a series of teeth, U, which are held to a cross-bar, U', by bolts $u'$, which pass through vertical slots $u$ of the teeth, and the cross-bar U' is rabbeted at its inner face to provide a lower lip or flange, $u^2$, which fits underneath the cross-bar S', which secures the main teeth S to the head M. To the bar U' are fixed a couple of metal staples or loops, $U^2$, which are slipped onto two of the teeth S, and when the bar U' is laid snugly against the bar S' a bolt, $U^3$, which has a head, $u^3$, overlapping one of the main teeth S at its rear side and is passed through the slot $u$ of one of the teeth U, is tightened by its nut, and the entire smoothing-harrow attachment is thereby held firmly to place. It is obvious that by loosening the bolts $u'$ $U^3$ the teeth U may be moved endwise to adjust their points in any required relation to the points of the main teeth S to work most effectively with different adjustments of the teeth S in any soil. The teeth U alternate with or stand in planes between the teeth S, as shown in Figs. 3 and 7 of the drawings. Under certain conditions of use of the machine I substitute for the teeth S on the heads M the longer teeth $S^3$, (shown in Fig. 11,) and which have points hooking forward instead of rearward as the points of the teeth S are shaped. The innermost tooth S of each of the frames E E' is provided with a laterally-projecting tooth or spur, S⁴, which operates to dig or break up the ground at points between the tracks of the teeth of the two frames. These teeth S⁴ are shown in Figs. 2, 3, and 7 of the drawings. Chains or cords V, which are held to hooks or eyes $v$ on the main frame A, will be engaged by hooks $v'$ on their free ends with hooks or eyes $v^2$ fixed to the tooth-holding heads M when the machine is adjusted for use as a drag harrow, as hereinafter more fully explained.

The drilling and cultivating plow attachment shown in Figs. 3, 9, and 10 of the drawings will next be described as follows: The plow mold-board W is pivoted by a vertical pin, $w$, to a stock or block, W', which is vertically grooved or recessed at its rear face to fit half-way around two of the main teeth S, carried by the head M on the frame E or E', and to the back of the stock a metal strap, W², is fixed so as to lie snugly against the backs of the teeth when the stock and strap are slipped upward upon the teeth. The stock W' has an upwardly-projecting stem, $w'$, which is rabbeted to fit upon the lower edge and against the front face of the cross-bar S', and a bolt, X, having a hook-head, $x$, engaging the rear side of one of the harrow-teeth S, is passed through the stem $w'$, above the cross-bar S', or it may be through said bar, and when the nut $x'$ of the bolt is tightened the entire plow attachment will be held to the teeth S, and through them to the head M and frame E. The fit of the stock W' and strap W² around the teeth S, and the fit of the stem $w'$ to the cross-bar S', allows the entire plow to be very quickly and easily adjusted and fastened by the one bolt, X, so as to be secure against either vertical or lateral movement on the teeth and assure maximum efficiency of the mold-board in the soil. To the back face of the mold-board W and near its broad end a pivot-bolt, $w^2$, is held in suitable bearings, and to this bolt is connected loosely one end of a stay-bar, Y, the other end of which is slotted at $y'$, to receive a bolt, $y$, which is passed through the slot into the end of the plow-stock W', as most clearly shown in Figs. 3 and 10 of the drawings. It is obvious that by loosening the bolt $y$ the mold-board W may be swung on its pivot-bolt $w$ to give it any required inclination to the line of draft of the machine, and may be secured in position by the bolt to cause the mold-board to cut a wider or narrower furrow, as the conditions of use may require.

Although I have shown the smoothing harrow attachment on one of the rotatory frames and the plow attachment on the other rotatory frame in Fig. 3 of the drawings, it will be understood that when these attachments are used each of the frames will be fitted either with the smoothing-harrow or plow. In other words, either the smoothing-harrow or the plow attachments will be used on both frames E or E' at the same time, and the two plows will have right and left hand mold-boards, respectively.

The general operation of the machine is as follows: We will suppose that the ground is to be plowed to prepare it for a crop. The smoothing-harrow teeth U and the plow W will be left off the main plowing-teeth S, and as the machine is drawn over the field the teeth S of both the frames or sections E E' will enter the soil alternately, and the gearing is proportioned to cause the teeth of each frame to enter the ground every six inches, and to any depth desired, by adjusting the tooth-heads M, as hereinbefore explained. The alternate action of the teeth of the two frames on the soil makes the action steady and continuous, and assures very light draft of the machine, and when the alternate movement of the two frames is broken by hoisting either frame over an obstruction or by other cause it is only necessary to stop the team and adjust the frames one in advance of the other by the levers and then latch the levers raised and start the team. In stony lands one toothed section only may be used, if preferred, and in tenacious soils a "land" will be struck out with the left-hand frame only in operation and working to a depth of a few inches, and the right-hand-frame teeth will be adjusted to work to twice this depth, and the next time around the field, when both frame-teeth are in action, the right hand-frame teeth will work in the path previously made by the left-hand-frame teeth, and so on around or across until the piece of land is plowed. Neither of the frames E E' should be thrown into gear when they are held raised by their levers engaging the catch L, nor should either of the frames be lifted by its lever when it is in gear. It is obvious that used in this way or as a plow the machine will not clog or leave dead furrows or ridges, and it will dig, invert, lift, disintegrate, and mix the soil in a most thorough manner, and the plowing will be even and accurate to any predetermined depth, and as the draft is directly from the main frame the machine will haul evenly and steadily. If the soil is quite light and friable, it may be prepared at once to receive some crops by using the smoothing-harrow attachments, or teeth V on both frames, thus saving the expense of harrowing.

When a piece of land is plowed by the teeth S alone, as above described, and it is to be harrowed, this may be done at once and without changing the team by driving the machine crosswise the other way over the plowed land, and the teeth S will grind and break up the coarse lumps of soil and fertilizer and mix all together to any desired depth, and if the smoothing-harrow teeth U are used both ways across the field a very fine and smooth seed-bed will be produced; and if it is desired to pulverize coarse fertilizer spread over grass-land this may be done by adjusting the teeth to work just at the ground-surface. For harrowing in small grain, the frames E, with the teeth S U attached, will be hung by the chains V, engaging the eyes $v^2$ from the main frame A, and after the clutch mechanism is adjusted to throw the frames out of gear the machine will be started to drag the teeth over the ground, and by adjusting the tooth-carrying heads M the teeth will be caused to enter the soil to any desired depth.

To use the machine as a cultivator, remove the teeth S which are in line with the rows of plants and operate the machine by rotating the frames E E' the same as for plowing, and should the plants be tall enough to be struck by the heads or frames when using the teeth S these teeth will be removed and the longer hooked teeth, $S^3$, substituted for them between the rows, and the frames E E' will be hung from the main frame by the chains V and the machine will be worked as a drag-harrow. After the land is operated on in this way by the teeth S or $S^3$ the plow attachments will be adjusted to the frames E E', and if the center of the machine is over the row of plants fix each plow to its respective frame toward or near the outer edge of the frame, and with the narrow parts of the mold-boards extending rearward and inward toward each other, and as the machine is drawn along over the row the mold-boards will ridge up the earth at each side of the plants. When the center of the machine is midway of the rows of plants, the two plow attachments will be changed as to relative positions, and their opposite mold-boards W will then act as a double mold-board plow to throw the earth to each side and heap it up against the plants. The plows may be used for cutting drills in harrowed land to receive seed, and the drill-furrows may be cut to any required depth by adjusting the tooth-heads M on the frames E, and to any required width by adjusting the mold-boards W on their pivots $w$ at more or less inclination to the line of draft of the machine.

It is obvious that with this one machine and attachments forming parts of it the soil may be broken and harrowed, and may also be cultivated at various stages of growth of a large variety of crops, and the work may be thoroughly done with economy of time and labor.

Having thus described my invention, what I claim as new, and desire to secure by Letters Patent, is—

1. In an agricultural implement, the combination, with the supporting-frame and drive-wheels, of an upper and lower crank shaft journaled in the frame, frames hung on the said shafts, tooth-heads secured to the frames, a pulley on the lower crank-shaft, a pulley on a counter-shaft, a belt passing around said pulleys, and means for operating the pulley on the counter-shaft from the drive-wheels, substantially as herein shown and described.

2. In an agricultural implement, the combination, with the frame E, of the sliding tooth-head M, adjustably secured to said frame, substantially as herein shown and described.

3. The combination, with the frame A and the driving-wheel B, of the ring B', surrounding the rim of the wheel, the face-plate $B^2$, covering the outer face of the said wheel, and the plate $B^3$, secured to the band B', and covering the lower half of the inner face of the said driving-wheel, substantially as herein shown and described.

4. The combination, with the frame A, supporting-wheels A', and tooth-carrying frames E E', hung on cranked shafts $e$ $e'$, journaled on frame A, of a shaft, C, drive-wheels D D', a belt, $d$, on said wheels, clutches C' $C^2$ on shaft C, next the wheels D, pinions $c$ on shaft C, drive-wheels B, meshing with pinions $c$, and lever mechanism on the frame and connected to operate the clutches, substantially as described, for the purposes set forth.

5. The combination, with a frame, A, supporting-wheels A', and tooth-carrying frames E E', hung on cranked shafts $e$ $e'$, journaled on the frame A, of a shaft, C, drive-wheels D D', a belt, $d$, on said wheels, clutches C' $C^2$ on shaft C, next to the wheels D, pinions $c$ on shaft C, drive-wheels B, meshing with pinions $c$, and levers F F' $F^2$, connected to each other and to the clutches C' $C^2$, substantially as described, for the purposes set forth.

6. The combination, with the frame A and frames E E', carrying teeth and hung on cranked shafts $e$ $e'$, journaled on the frame, substantially as specified, of levers H J, connected to the frames E E' by cords or chains $h$ $j$, passed through guides on the frame, and a catch-plate, L, fixed to the frame and adapted to retain the levers, substantially as described, for the purposes set forth.

7. The combination, with the frame A and frames E E', carrying teeth and hung on cranked shafts $e$ $e'$, journaled on the frame, and levers H J, fulcrumed on the frame A and connected to the frames E E', substantially as specified, of a rod, I, on the main frame, and spring-actuated catches H' J' on the levers H J, respectively, substantially as described, for the purposes set forth.

8. The combination, with a supporting-frame and a pair of rotatory frames, E E', hung by cranked shafts on the supporting-frame, of laterally-projecting teeth $S^4$ on the adjacent or inner teeth of the frames E E', substantially as described, for the purpose set forth.

9. The combination, with the main frame and a rotatory frame, as E, hung on cranked shafts journaled on the main frame, of a vertically-adjustable tooth-carrying head, M, a cross-bar, P, and bolts R, substantially as described, for the purposes set forth.

10. The combination, with the main frame and a rotatory frame, as E, hung on cranked shafts journaled on the main frame, of a vertically-movable tooth-carrying head, M, fitted to the frame E, and having a stem, $m$, a pin, O, on the frame E, and springs T T, having shoulders $t$ $t$, allowing the toothed head to yield and rise should the teeth strike an obstruction, substantially as herein set forth.

11. The combination, with the main frame and a rotatory frame, as E, hung on cranked shafts journaled on the main frame, of a vertically-movable tooth-carrying head, M, fitted to the frame E, and having a stem, $m$, a pin, O, on frame E, and springs T T, having shoulders $t$ and inclined parts $t'$, substantially as shown and described.

12. The combination, with the tooth-carrying head M and teeth S, of a cross-bar, $s$, fixed to head M and entering notches of the teeth, a binding-bar, S', notched over the teeth, and fastening-bolts $S^2$, substantially as shown and described.

13. The combination, with the tooth-carrying head M and teeth S, of a cross-bar, $s$, fixed to head M, lateral stays, as $s'$ or $s^2$, fixed to the head at the upper parts of the teeth, and fastening-bolts $S^2$, substantially as shown and described.

14. The combination, with the tooth-head M, provided with teeth S, of the slotted teeth U, a cross-bar between the teeth S and U, and bolts and staples for securing the teeth U to the said cross-bar and teeth S, substantially as herein shown and described.

15. The combination, with a rotatory frame or head and teeth S held thereto by a bar, S', and bolts $S^2$, substantially as specified, of a smoothing-harrow attachment comprising a bar, U', fitted to the bar S', teeth U, having slots $u$, bolts $u'$, passed through said slots to secure the teeth adjustably to the bar U', staples or loops $U^2$, fixed to the bar U' and adapted to engage the teeth S, and a bolt, $U^3$, holding the smoothing-harrow to the teeth S and their support, substantially as described, for the purposes set forth.

16. In an agricultural implement of the character described, the combination, with a toothed frame supported from the main frame of the machine and one or more series of teeth, of drag-chains V, attached to the main frame and adapted to be secured to the toothed frame, whereby the spading action of the teeth is changed to the action of fixed cultivator-teeth, substantially as described, for the purposes set forth.

17. In an agricultural implement of the character described, the combination, with a main frame and a toothed frame carried thereby, of a plow attachment comprising a stock held to the toothed frame, a mold-board pivoted to the stock for adjustment horizontally, and a fastening securing the mold-board in operative position, substantially as described, for the purposes set forth.

18. The combination, with a main frame and a toothed frame, as E M S, held thereto, of a plow-stock, W', notched over the teeth S, a strap, $W^2$, fixed to the stock and inclosing said teeth, and a bolt, X, holding the stock to one of the teeth S, a mold board, W, pivoted to the stock on a vertical pin, and an adjusting and fastening device comprising a pin, $w^2$, a slotted bar, Y, and a bolt, $y$, all arranged for operation substantially as described, for the purposes set forth.

FRANKLIN PIERCE SANBORN.

Witnesses:
WILLARD T. CRAM,
HENRY C. SANBORN.